United States Patent
Chuang-Sung et al.

[11] Patent Number: 5,918,066
[45] Date of Patent: Jun. 29, 1999

[54] METHOD AND DEVICE FOR DISPLAYING CONFIGURATION INFORMATION OF A COMPUTER THROUGH A SPEAKER OUTPUT PORT OF THE COMPUTER

[76] Inventors: Chang Chuang-Sung, 1FL, No.9, Aly.10, Ln.132, Jong-Pyng Rd., Hsinchuang, Taipei; Lee Kuang-Wei, No.17,Fu-Kui Lane 4,Jung-Hou Rd., Taya, Taichung, both of Taiwan

[21] Appl. No.: 08/908,568

[22] Filed: Aug. 8, 1997

[51] Int. Cl.[6] .................................................. G06F 13/00
[52] U.S. Cl. ........................... 395/822; 395/882; 395/309
[58] Field of Search .................................... 395/182, 309, 395/750.01, 822, 882

[56] References Cited

U.S. PATENT DOCUMENTS

| | | | |
|---|---|---|---|
| 5,101,481 | 3/1992 | Anger et al. | 395/309 |
| 5,151,907 | 9/1992 | Robbins | 395/182.2 |
| 5,404,542 | 4/1995 | Cheung | 395/750.01 |
| 5,555,374 | 9/1996 | Armerding et al. | 395/822 |
| 5,812,879 | 9/1998 | Moro | 395/882 |
| 5,832,244 | 11/1998 | Jolley et al. | 395/309 |

*Primary Examiner*—Thomas C. Lee
*Assistant Examiner*—Michael G. Smith
*Attorney, Agent, or Firm*—Raymond Sun

[57] ABSTRACT

A method and device for displaying the internal information of a computer, such as CPU type, CPU operating speed, memory size, real time clock, BIOS version, and OS version, and those data which are inputted by user, is disclosed. The displaying device is provided with a displaying unit mounted on the front panel of the computer to display the information signals which are transmitted from the computer through the speaker output port on the mother board of the computer. The device further includes a spare power supply to provide power energy for displaying the information when the computer is shut down.

10 Claims, 6 Drawing Sheets

METHOD AND DEVICE FOR DISPLAYING CONFIGURATION INFORMATION OF A COMPUTER THROUGH A SPEAKER OUTPUT PORT OF THE COMPUTER

FIELD OF THE INVENTION

The present invention relates to a method and device for displaying the internal information of a computer, and more particularly to a method and device for displaying the operating status and various internal system information of the computer via a speaker output port of the mother board of the computer.

BACKGROUND OF THE INVENTION

The traditional computer, such as 286, 386, and 486, is provided with a LED displaying unit, as shown in FIG. 1. The LED displaying unit is usually mounted on the front panel of the computer case and is capable of indicating the operation speed, such as 20 or 33 MHz, of the computer system. So, the user may know the performing status of the computer system. Normally, the values on the LED displaying unit are fixed once the computer is installed and can not be changed by the user if the CPU is replaced with another one or upgraded.

The traditional LED displaying unit can only show that the central processing unit of the computer is operated in TURBO or non-TURBO mode. The operation mode indicated on the displaying unit is normally set by the computer manufacturer, and does not indicate the real performing efficiency of the computer system during working. This results in inconvenience for different types of CPUs, such as 386, 486, Pentium, and so on. That is, once the CPU of the computer is changed, the LED displaying unit must be manually set in accordance with the new CPU. The LED displaying unit with fixed value to show the CPU speed is hard to support the modern computer system because there are so many types of CPU with different operation speeds. Therefore, such LED displaying unit is not used in the current computer system incorporated advanced central processing unit, such as Pentium processor issued by Intel corporation.

A displaying module on the outer case of the computer is greatly needed to directly displaying the internal system information, the configuration oft he computer, and peripheral devices used of the computer during power-on or power-off without opening the case to examine.

SUMMARY OF THE INVENTION

Therefore, the primary object of the present invention is to provide a displaying device for displaying the static and/or dynamic system information of the computer system, including CPU type, CPU speed, memory size, real time clock, BIOS (Basic input/output system) version, OS (Operation system) version, hard disk storage capacity, and peripheral devices coupled to the computer system. Besides, those information or data which is inputted by the user, such as user name, date, and time, may be displayed on the displaying device.

The other object of the present invention is to provide a displaying device with a LCD displaying unit which is preferably mounted on the front panel of the computer case for displaying the internal system information of the computer, so that the user may conveniently know the working status of the computer by means of the LCD displaying unit.

The other object of the present invention is to provide an information displaying module capable of simply receiving the internal system information from the computer. The displaying module of the present invention is connected between the speaker and the speaker output port mounted on the mother board of the computer.

The other object of the present invention is to provide a method for displaying internal system information of a computer by receiving a series of information signals via the speaker output port of the computer. The method mainly comprises steps of: generating and transmitting a serial of information signals to be displayed on the displaying unit via the speaker output port of the computer to the displaying device; detecting and receiving the information signals sent from the speaker output port of the computer; disabling the speaker during the transmission of the information signals; and decoding and displaying the information signals on the displaying unit. In such control processes, the displaying device may transfer the corresponding digital information from the computer through the speaker output port to the displaying module by appropriate encoding, decoding, and control process without influence on the normal function of the speaker.

The other object of the present invention is to provide a method for transmitting a series of information signals via the speaker output port of the computer to the displaying device. The method comprises the following steps: transmitting a series of starting signals with high frequency for a predetermined period of time; disabling the speaker when the displaying device receives the starting signals; transmitting a series of baud rate determining signals for a predetermined period of time; receiving the baud rate determining signals and determining the transmitting rate thereof according to the baud rate determining signals; and transmitting the information signals generated by the computer to the displaying device via the speaker output port; receiving the information signals and displaying the information carried by the information signals on the displaying unit of the displaying device.

Other features and advantages of the present invention will become apparent from the following description which refers to the accompanying drawings.

DETAILED DESCRIPTION OF THE PREFERRED EMBODIMENTS

Figure 1:
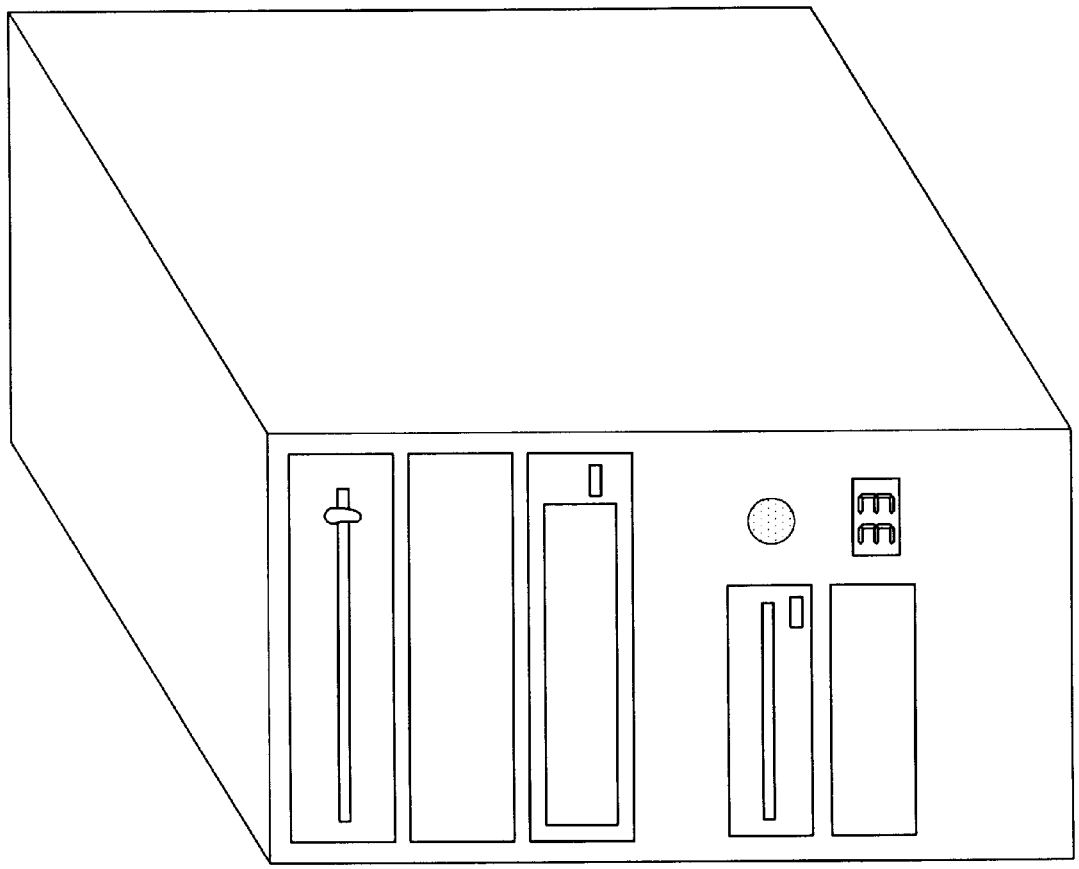
FIG. 1 shows a LED displaying unit is mounted on the front panel of a prior art computer case.
Figure 2:
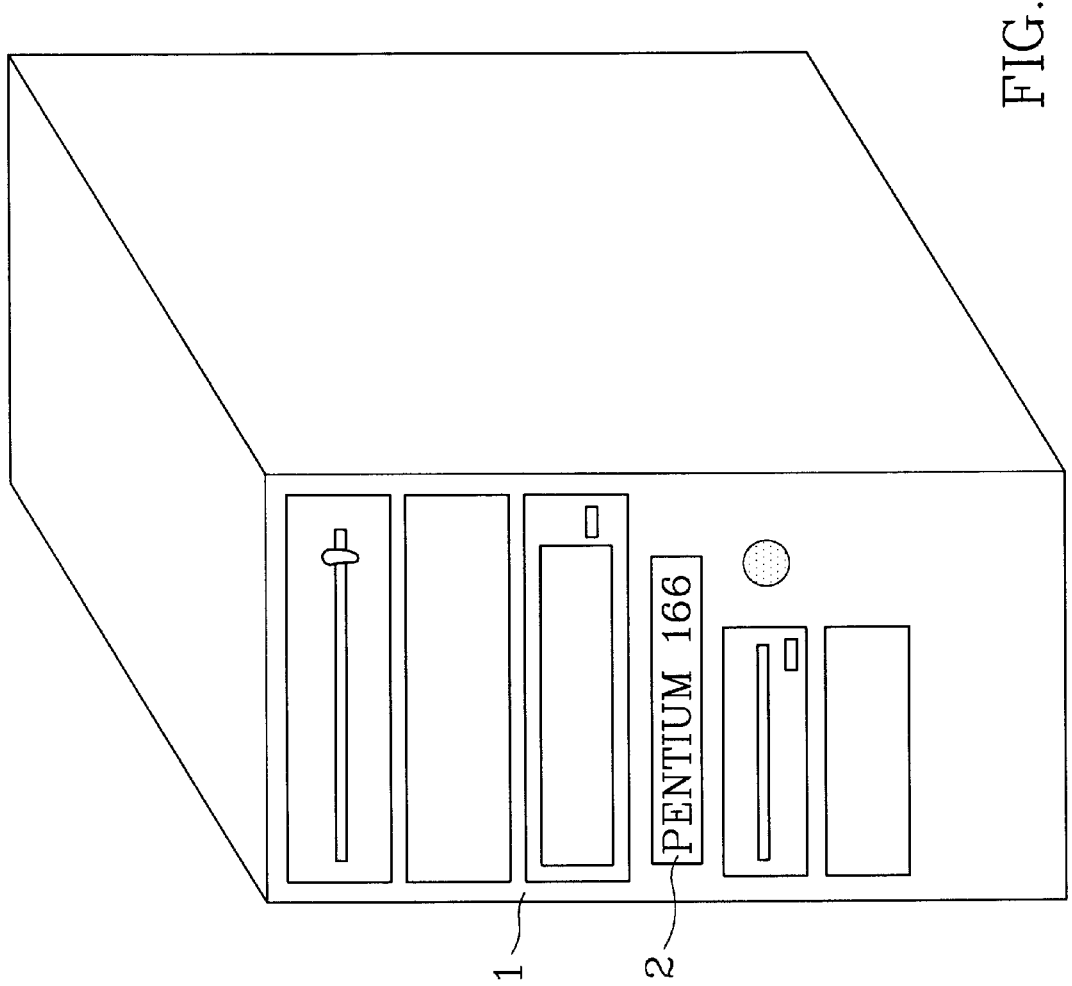
FIG. 2 shows an information displaying module is mounted on a front panel of a computer case in accordance with a preferred embodiment of the present invention.

With reference to FIG. 2, there is shown a LCD displaying module 2 is mounted on the front panel of a computer case 1 in accordance with the present invention. The LCD displaying module 2 is capable of displaying the type of the central processing unit, such as PENTIUM 166 as shown in this case, and the other system information relevant to the computer system.

Figure 3:
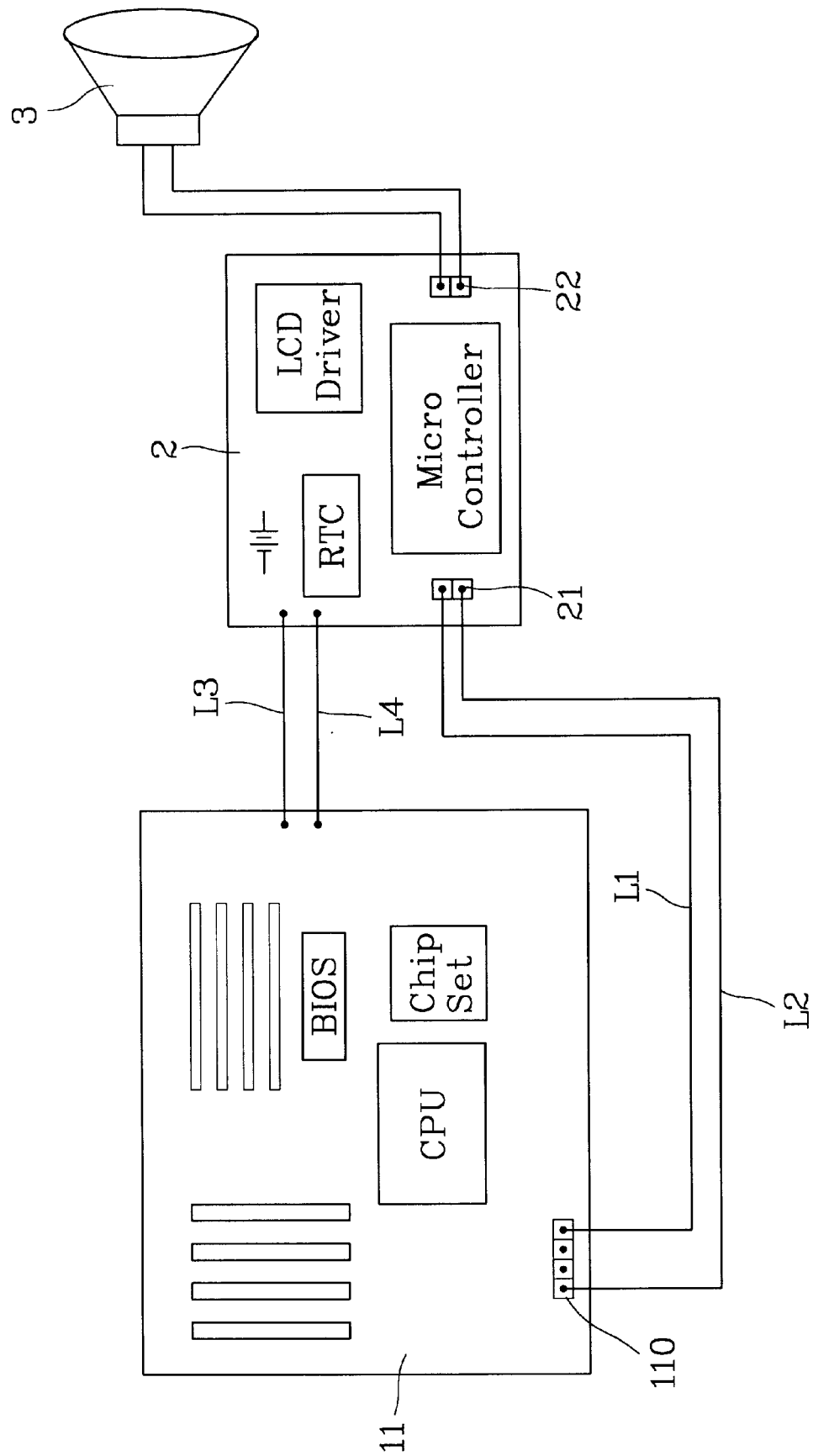
FIG. 3 is a schematic diagram showing a displaying device of the present invention is connected between a speaker output port mounted on the mother board of the computer and a speaker.

FIG. 3 is a schematic diagram showing that the displaying module 2 of the present invention is provided with a signal receiving port 21 which is electrically connected to the speaker output port 110 mounted on the mother board 11 of the computer system by a pair of wires including a power line L1 and a data line L2. The displaying module 2 is provided with a speaker connecting port 22 which is connected to a speaker 3. The wires L1 and L2 connected between the mother board 11 and the displaying module 2 of the present invention are used to transfer both the information signals desired to be shown to the displaying module 2 and the speaker signal to the speaker 3 via the displaying module 2.

In addition, the displaying module 2 of the present invention gets normal electric power energy from the mother board 11 of the computer system via a power source line L3 and a ground line L4.

Typically, there is a speaker output port or a speaker connector on the mother board of the present various personal computers available in the market, so that the displaying module of the present invention can be easily installed and incorporated with the computer system in practice.

Figure 4:
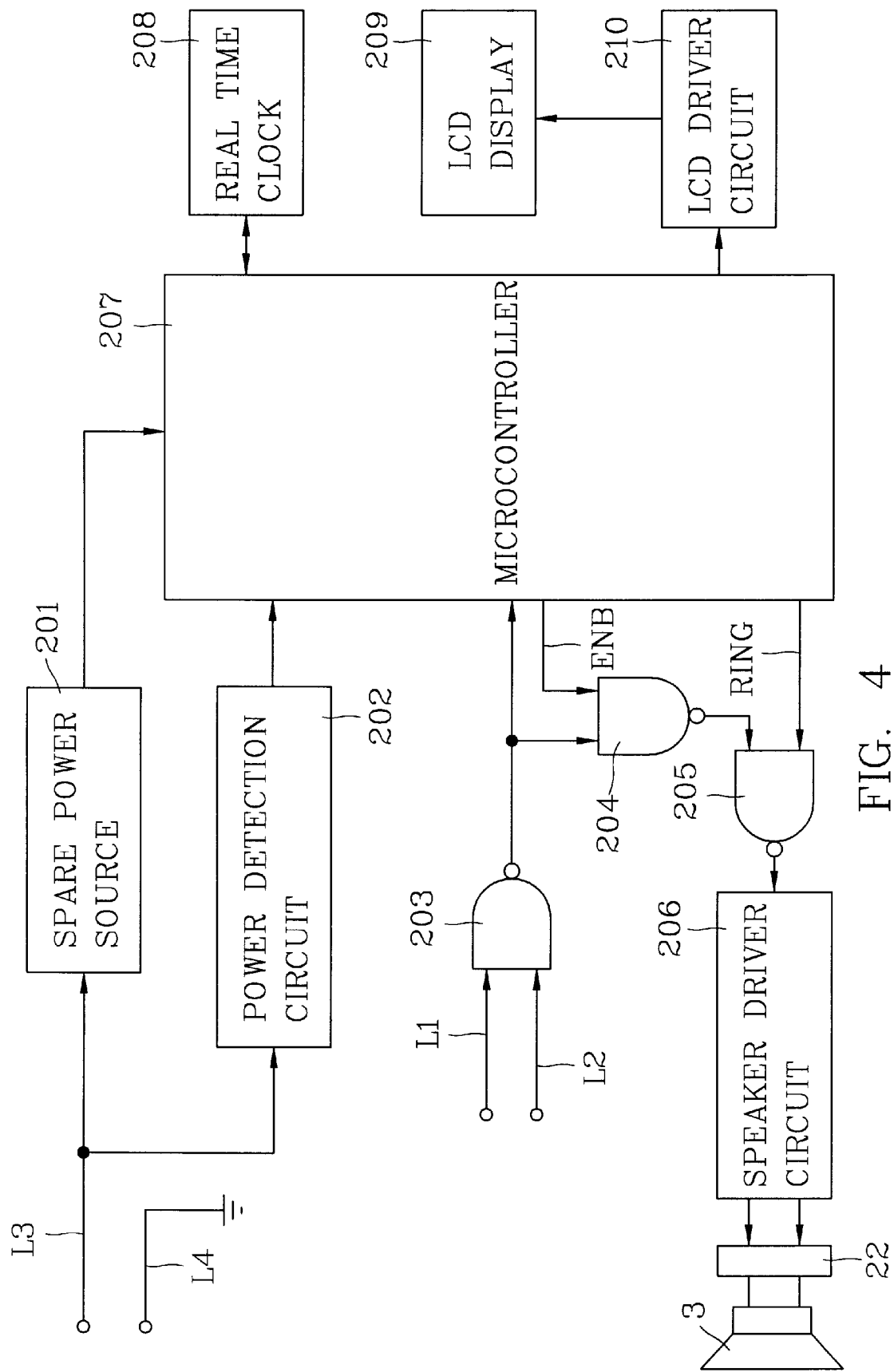
FIG. 4 is a functional circuit block diagram of the displaying device of the present invention.

With reference to FIG. 4, the present invention mainly includes a spare power source 201, a power detection circuit 202, a number of NAND gates 203, 204, and 205, a speaker driver circuit 206, a single chip microcontroller 207, a real time clock 208, a display unit 209, and a LCD driver circuit 210.

The spare power source 201 can provide electric power energy for the displaying module of the present invention when the computer is shut down and can be charged by the main power supply via lines L3 and L4 when the computer is power-on.

The spare power source 201 may includes a rechargeable battery, a non-rechargeable battery, or a super capacitor with large electrical capacity. The rechargeable battery may be charged to store electrical power during the computer is power-on. The spare power source 201 can supply sufficient power to the LCD panel to perform normal displaying operation when the computer is shut down.

In the preferred embodiment of the present invention, the displaying unit 209 is a dot matrix type LCD display. The LCD display may be powered by the spare power source in the present invention when the computer is power-off because the power consumption of the LCD is low. Those techniques are well known.

The power detection circuit 202 is used to detect the power ON/OFF state of the computer. According to the ON/OFF state of the computer, the user can utilize the DOS driver program to program the LCD display to show the internal configuration status of the computer, present data, or time.

The present invention is further described as follows:
1. Data transfer between the mother board and the displaying module:

In general, data transfer between the mother board and peripheral devices is achieved by I/O interface card slot, such as ISA Bus, EISA Bus, VL Bus, and PCI Bus. However, the speaker output port is used to transfer data in the present invention in order to not only save the cost of the I/O interface card but also simplify the installation process.

Figure 5:
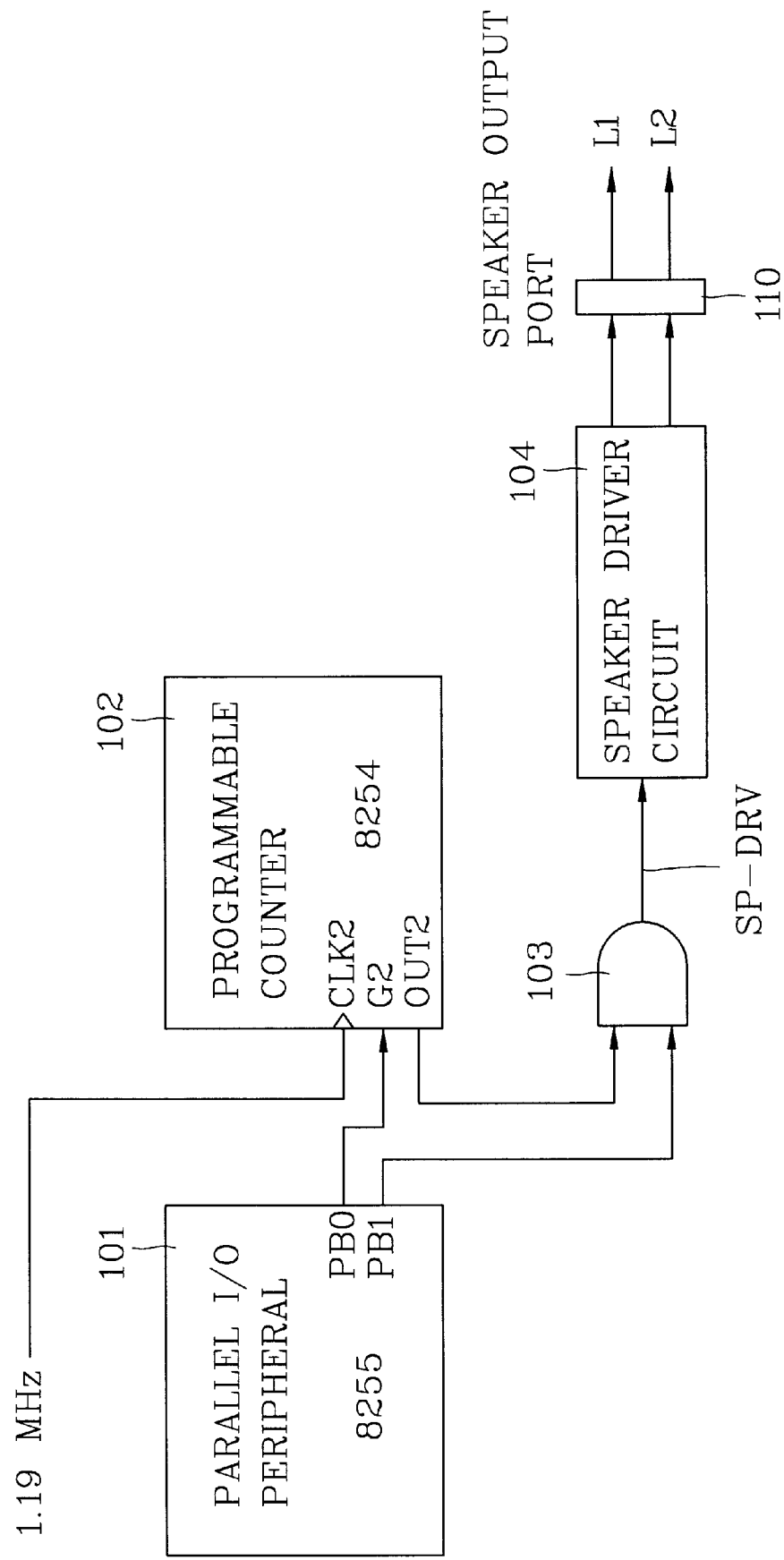
FIG. 5 is a functional circuit block diagram showing a speaker signal generating circuit.

For example, FIG. 5 shows an exemplary control circuit for generating the speaker signal, such as a known PC/AT computer. The control circuit of the speaker controlling circuit comprises a parallel I/O peripheral 101, a programmable counter 102, an AND gate 103, and a speaker driver circuit 104. The second data bit PB1 of the data port B of the parallel I/O peripheral 101 is coupled to one input terminal of the AND gate 103, which acts as a speaker enable signal to enable the speaker. The other input terminal of the AND gate 103 is coupled to the output terminal OUT2 of the programmable counter 102. The output of the AND gate 103 can supply a speaker driving signal SP_DRV to the speaker driver circuit 104.

The speaker driving signal SP_DRV is at logic low level when data bit PB0 is at logic low level. At this time, the speaker is disabled and therefor no sound is generated. The first data bit PB0 of the Port B of the parallel I/O peripheral 101 is used to enable the programmable counter 102.

The programmable counter 102 is disabled when data bit PB0 is at logic low level, while it can generate output signals at output terminal OUT2 when data bit PB0 is at logic high level.

The programmable counter 102 is often programmed in square wave mode in order to trigger the speaker to generate sound. The tone of the sound can be tuned by simply adjusting the frequency of the square wave. The present invention can transfer digital signals to the speaker output port by controlling the data bits PB0 and PB1 of the parallel I/O peripheral 101 and the programmable counter 102 under appropriate operation mode with suitable encoding process.

2. Data transferring processes:

The present invention provides a data transferring method for the computer and the displaying module, which can determine whether the output signal sent from the speaker output port is information signals or normal sound signals. This method mainly includes the following steps:

(a) Beginning of data transmission;
(b) Detection of data transmission baud rate;
(c) Data transfer and encoding; and
(d) End of data transmission.

Figure 6A:
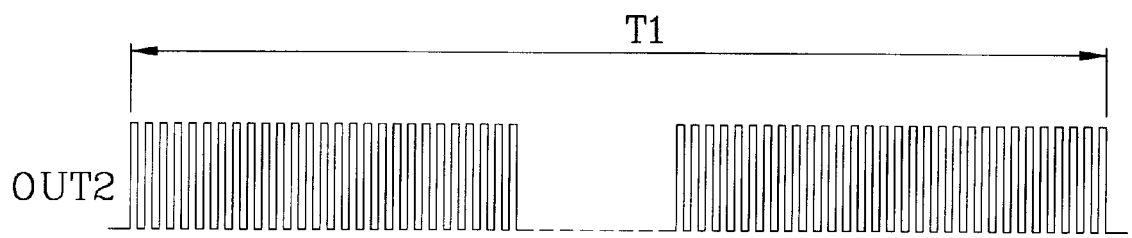
FIG. 6A shows the starting signal generated by the speaker signal generating circuit shown in FIG. 5 at the beginning of transmitting the information signals.

The processes will be further described as follows:
(a) Beginning of data transmission:

It is noted that sound signal with frequency more than 100 KHz is not sensible to human ears and may not be generated by the speaker. This high frequency signal is used to indicate beginning of the digital signals in the present invention. The input clock CLK2 of the programmable counter 102 is 1.19 Mhz in FIG. 5 and can be converted into 600 KHz at the output terminal OUT2, as shown in FIG. 6A, by process of dividing frequency and operation under square wave operation mode of the programmable counter. That is, at this step, a high frequency starting signal is transmitted from the speaker output port of the computer to the displaying device for a predetermined period of time T1.

The microcontroller 207 of the displaying module will disable the speaker 3 by closing an enable signal ENB when the high frequency signal is received via lines L1 and L2 as the beginning of data transmission and then the present invention is operated in baud rate detection process which will be described below.

Figure 6B:
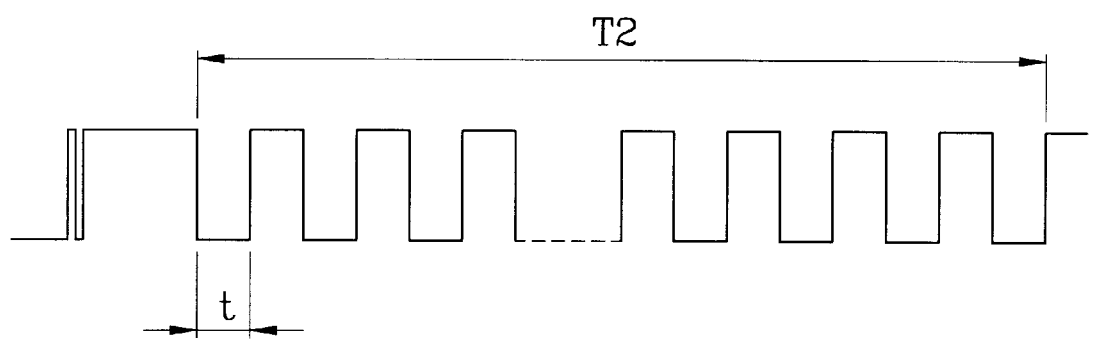
FIG. 6B shows the baud rate determining signal generated by the speaker signal generating circuit shown in FIG. 5, following the starting signal shown in FIG. 6A.

(b) Detection of data transmission rate:

The process is used to detect the data transmission rate for the serial data which is transmitted from the mother board to the microcontroller 207. At this step, the speak output port will send out a baud rate determining signal to the displaying device for a predetermined period of time T2, as shown in FIG. 6B, following the starting signal shown in FIG. 6A.

When a command data is written into the programmable counter 102 which is operated in software triggered strobe mode, the output terminal OUT2 thereof will maintain high level state to start counting, output a low pulse 0 as the value in the counter is counted to zero, and finally return to high level state to wait for another command character to repeat the above operation. The present invention utilizes the property of the high level state maintained by the programmable counter 102 and continuously controls the ON/OFF operation of the data bit PB1 in the Port B of the parallel I/O peripheral 101 in order to make the speaker output port to generate a set of continuous square wave. The pulse width t shown in FIG. 6B of the square wave is the data transfer time for each bit to transfer. After a predetermined time T2 as shown in FIG. 6B, the computer will identify that the detection is accomplished and then set the data bit PB1 to ON state in order to wait for data transfer described below.

Figure 6C:
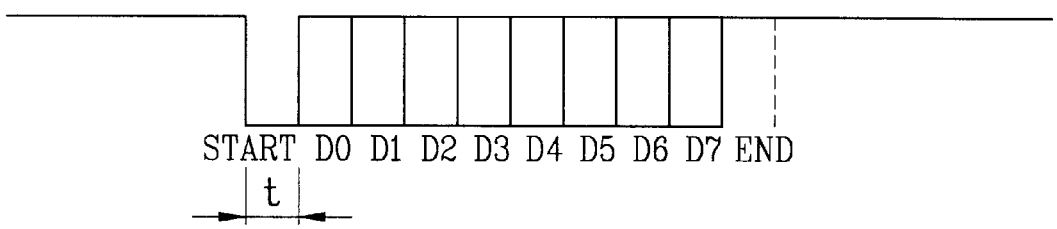
FIG. 6C shows the data format of the information signal sent from the speaker output port of the computer.

(c) Data transmission and encode:

The device is operated in data transfer mode after the data transfer rate is detected. Asynchronous transfer is used in the present invention to transmit the serial data. A start bit is sent at the beginning of each data byte, and an end bit at the end after modulation process, as shown in FIG. 6C. The ON/OFF operation of the Bit 1 in the Port B of the parallel I/O peripheral 101 is used to modulate each bit of the above data and the transfer time is t. The data can be transmitted from the speaker output port. The microcontroller can easily receive the data by this standard method for encoding serial data.

(d) End of data transmission:

This signal is high frequency and is similar to the beginning of data transmission at step (1) with different frequency. The data transmission is taken as being accomplished by the microcontroller when the signal for the end of data transfer is received. The speaker enable signal END is opened again and the speaker output signal from the mother board may sent to the speaker driver circuit 206 in order to enable the speaker to perform normal operation for generating sound.

The speaker driver circuit 206 is a simple type of amplifying circuit to drive the speaker 3 connected to the displaying device.

The present invention can not only display the internal configuration status of the computer but also the date and time from the real time clock 208. The date and time can be automatically adjusted by the data of the real time clock transferred from the mother board. Therefore, the user may save setting the time and date.

The microcontroller 207 may generate an alarm clock driving signal RING to drive the speaker driver circuit 206 in order to generate sound. The present device may serves as a timer or an alarm clock, which is programmed by appropriate software stored in the microcontroller 207 with the real time clock 208.

The present invention comprises a reverse wiring connection prevention circuit for preventing the data line L1 and the power line L2 connected between the signal receiving port of the microcontroller 207 and the speak output port of the computer from reverse connection. The circuit comprises a NAND gate 203 with a first input terminal coupled to the data line L1 and a second input terminal coupled to the power line L2, and the output of the NAND gate 203 is connected to the signal input terminal of the microcontroller 207. If the data line and power line are inversely connected to the speaker connector, the device can still receive the correct signal from the speak output port of the mother board.

The present device is controlled by the CPU of the computer through the driving program under the BIOS or DOS operation mode. The data transferred to the present invention will follow the appropriate data transmission and communication protocol. The basic information about the configuration, the mother board, the CPU, the memory size, and other peripheral devices of the computer can be transferred to the present device as the power-on self test via the speak output port of the computer. The detection techniques for the above information is well known in the prior arts. The driving program under the DOS mode provides a simple method for controlling all the built-in functions in the present device, including selectively displaying the internal configuration of the computer, the words and graphics which is inputted by the user, the date, and the time, initializing the universal calendar, the clock, and the alarm, and other displaying methods and functions. The universal calendar or clock is set and automatically adjusted by real time data from the computer.

The driving program of the present invention may be stored in BIOS of the computer to achieve that corresponding information about internal configuration of the computer is transmitted to said device to really display said internal system of the computer after power on self test for the computer and detection of peripheral devices connected to the computer are accomplished. The driving program is also possible to be operated under DOS mode to control corresponding functions of said device such as switching to a universal calendar, clock, or alarm as well as automatically detect said internal configuration of the computer and transmit corresponding information to said device.

In practice, the LCD driver circuit 210 and the microcontroller 207 may be combined as a single chip microcontroller or ASIC with ability of driving the LCD display 209. The power detection circuit 202 and the microcontroller 207 may be combined as a single chip microcontroller or ASIC with ability of detecting power status of the computer. The speaker driver circuit 206 and the microcontroller 207 may be combined as a single chip microcontroller or ASIC with ability of driving said speaker. The real time clock 208 and the microcontroller 207 may be combined as a single chip microcontroller or ASIC with function of the real time clock.

Although only the preferred embodiments of this invention were shown and described in the above description, it is requested that any modification or combination that comes within the spirit of this invention be protected.

What is claimed is:

1. An information displaying device for displaying internal system information of a computer, which is connected between a speaker output port of the computer and a speaker, the speaker output port sending out output signals including speaker actuating signals and information signals to be displayed on the displaying device, the displaying device comprising:

a signal receiving port connected to the speaker output port of the computer via signal lines for receiving the speaker actuating signals and information signals from the speaker output port of the computer;

a speaker connecting port connected to the speaker;

a displaying unit for displaying the internal information of the computer;

a microcontroller having a signal input terminal for receiving the output signals from the speaker output port via the signal receiving port, the microcontroller generating a speaker enabling signal responsive to the speaker actuating signals and generating information displaying signals responsive to the information signals; and a speaker actuating circuit including a NAND gate with a first input terminal electrically coupled to the signal line of the signal receiving port and a second input terminal for receiving the speaker enabling signal generated by the microcontroller, the output of the speaker actuating circuit sending out a speaker signal in case that the speaker enabling signal is received from the microcontroller.

2. The information displaying device as claimed in claim 1, further comprising a power detection circuit for detecting the power supplying status of the computer system and a spare power source, the spare power source supplying electric power energy to the device when the power detection circuit detects the power source to the computer is shut-down.

3. The information displaying device as claimed in claim 1, wherein the displaying unit is mounted on a front panel of the computer.

4. The information displaying device as claimed in claim 1, wherein the internal system information displaying on the displaying unit of the information displaying device comprises manufacturer, type, and operation rate, system memory size, fixed disk storage capacity, BIOS version, OS version, date, time of the computer system, peripheral devices connected to the computer.

5. The information displaying device as claimed in claim 1, further comprising a real time clock for providing clock signal to the microcontroller.

6. The information displaying device as claimed in claim 1, wherein the signal lines connected between the signal receiving port of the information displaying device and the speaker output port of the computer comprises a power line and a data line, the data line serving as a data transmitting line for transmitting the information signals sent from the speaker output port of the computer.

7. The information displaying device as claimed in claim 1, further comprising a reverse wiring connection prevention circuit for preventing the data line and the power line of the signal lines from reverse connection, the circuit comprising a NAND gate with a first input terminal coupled to the data line and a second input terminal coupled to the power line, and the output of the NAND gate being connected to the signal input terminal of the microcontroller.

8. The information displaying device as claimed in claim 1, wherein the displaying unit is a dot matrix type LCD display.

9. A method for displaying internal system information of a computer under control of a displaying device with a displaying unit, the displaying device being connected between a speaker and a speaker output port of the computer, comprising steps of:

(a) generating and transmitting a serial of information signals to be displayed on the displaying unit via the speaker output port of the computer to the displaying device;

(b) detecting and receiving the information signals sent from the speaker output port of the computer;

(c) disabling the speaker during the transmission of the information signals; and (d) decoding and displaying the information signals on the displaying unit.

10. The method as claimed in claim 9, wherein the step of detecting and receiving the information signals comprises the following steps:

(a). transmitting a series of starting signals with high frequency for a predetermined period of time via the speaker output port of the computer to the displaying device;

(b). disabling the speaker when the displaying device receives the starting signals;

(c). transmitting a series of baud rate determining signals for a predetermined period of time via the speaker output port of the computer to the displaying device;

(d). receiving the baud rate determining signals and determining the transmitting rate thereof according to the baud rate determining signals;

(e). transmitting the information signals generated by the computer to the displaying device via the speaker output port; and (f). receiving the information signals and displaying the information carried by the information signals on the displaying unit of the displaying device.

* * * * *